United States Patent Office 3,280,209
Patented Oct. 18, 1966

3,280,209
PROCESS FOR THE PRODUCTION OF DIENES
Richard G. Tonkyn, Mendham, N.J., assignor to Union
Carbide Corporation, a corporation of New York
No Drawing. Filed July 8, 1964, Ser. No. 381,261
18 Claims. (Cl. 260—681)

This invention relates to a process for the production of dienes and more particularly to the production of conjugated dienes.

Dienes are important commerically as intermediates in the synthesis of pyrethrins used for insecticide formulations. For example, 2,5-dimethyl-2,4-hexadiene is converted to ethyl chrysanthemum carboxylate by reaction with diethyl sodiomalonate and thence to pyrethrins. Hitherto such 2,5-dialkyl-2,4-hexadienes have been available only through tedious and expensive synthetic processes. One such process involves a Grignard coupling of methallyl chloride followed by an acid isomerization reaction of the coupled product

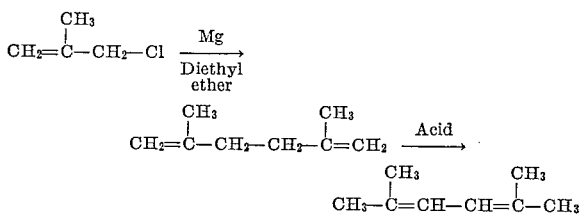

It is, therefore, an object of this invention to provide a facile process for the production of conjugated dienes.

It is a further object to provide a catalytic process for the production of 2,5-dialkyl-2,4-hexadienes.

It is another object to provide a process for the production of 2,5-dialkyl-2,4-hexadienes from readily available starting materials.

These and other objects will become apparent to those skilled in the art from an examination of the detailed description of the invention given below.

These objects have been attained by a process which comprises dehydrating an unsaturated aliphatic alcohol having the structure:

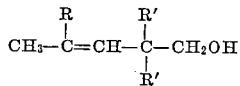

wherein R is selected from the group consisting of hydrogen and monovalent lower saturated aliphatic hydrocarbons, and each of R' is a monovalent lower saturated aliphatic hydrocarbon radical containing up to 10 carbon atoms inclusive. Representative of such radicals are methyl, ethyl, propyl, butyl, isobutyl, pentyl, hexyl, isohexyl, heptyl, octyl, 2-ethylhexyl, nonyl and like radicals. Representative alcohols which can be used include the following:

2,2-dimethyl-3-penten-1-ol,
2-methyl-2-ethyl-3-penten-1-ol,
2,2-dimethyl-3-ethyl-3-penten-1ol,
2-methyl-2,4-diethyl-3-penten-1-ol,
2,2-dimethyl-4-isopropyl-3-penten-1-ol,
2,2-diethyl-4-methyl-3-penten-1-ol,
2,2,4-triethyl-3-penten-1-ol,
2,4-dimethyl-2-propyl-3-penten-1-ol,
2,2-dimethyl-4-butyl-3-penten-1-ol,
2-methyl-2-ethyl-4-propyl-3-penten-1-ol,
2,2-dipropyl-4-methyl-3-penten-1-ol,
2,2-dipropyl-4-ethyl-3-penten-1-ol,
2,2,4-tripropyl-3-penten-1-ol,
2-methyl-2-isopropyl-3-penten-1-ol,
2,4-dimethyl-2-isopropyl-3-penten-1-ol,
2,2-dimethyl-4-neopentyl-3-penten-1-ol,
2-methyl-2-ethyl-4-neopentyl-3-penten-1-ol,
2,2-dimethyl-4-hexyl-3-penten-1-ol,
2,2-dimethyl-4-heptyl-3-penten-1-ol,
2,2-dimethyl-4-octyl-3-penten-1-ol,
2,2-dimethyl-4-isoctyl-3-penten-1-ol,
2,2-dimethyl-4-(2-ethylhexyl)-3-penten-1-ol,
2,2-dimethyl-4-nonyl-3-penten-1-ol, and
2,2-dimethyl-4-decyl-3-penten-1-ol.

This invention can be demonstrated by the dehydration of 2,2,4-trimethyl-3-penten-1-ol over a Houdry S-90 catalyst (silica-alumina catalyst of composition 12.4% $Al_2O_3$ and 87.3% $SiO_2$) at about 50° C. to 200° C. The dehydration is conveniently effected by passing the alcohol through a heat resistant glass tube packed with the catalyst under an inert, non-oxidizing atmosphere. Suitable as inert atmosphere are gases such as nitrogen, helium, argon and the like.

In addition to the silica-alumina catalyst mentioned above others which can be used include alumina, silica, Linde molecular sieves such as Zeolite A and Zeolite X described by R. M. Milton in U.S.P. 2,882,243 and 2,882,244 or natural zeolites, thoria and the like.

Inasmuch as the structure of 2,2,4-trimethyl-3-penten-1-ol

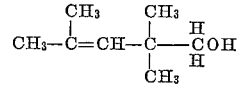

precludes a simple dehydration because of the unavailability of an H atom on the 2 or alpha carbon atom, if the double bond participated in the reaction, one would expect a vinyl cyclopropane product. Instead, a surprisingly unexpected rearrangement takes place during the dehydration process producing the diene 2,5-dimethyl-2,4-hexadiene,

The rearrangement may be an example of a homoallylic rearrangement occurring in an open chain system via a cyclopropyl carbinyl carbonium ion intermediate although it is not intended that this invention be limited to any particular explanation or theory.

The starting unsaturated aliphatic alcohols used in this invention can be prepared by reduction of the corresponding unsaturated aliphatic aldehydes which are readily obtainable from lower aldehydes by an aldol condensation technique well known in the art.

Thus, the alcohol 2,2,4-trimethyl-3-penten-1-ol is readily available by reduction of the aldol condensation product of isobutyraldehyde, 2,2,4-trimethyl-3-pentenal

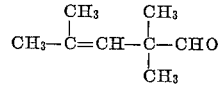

The temperature at which the dehydration of the unsaturated aliphatic alcohols of this invention takes place is not narrowly critical. Thus, temperatures as low as about 50° C. and as high as about 200° C. can be conveniently employed. When Houdry S-90 (having the composition 12.4% $Al_2O_3$ and 87.4% $SiO_2$), is used as the dehydration catalyst, a temperature range of about 80° C. to 150° C. is preferred. With an alumina catalyst, a range of 90° to 200° C. is preferred. With molecular sieves a temperature range of about 100 to 250° C. is preferred; while with $SiO_2$ a temperature range of about 100 to 300° C. is preferred.

The space velocity is not narrowly critical but is a function chiefly of the reaction temperature. Thus, it is preferred to increase the space velocity as the temperature is increased and diminish it as the temperature is decreased.

A preferred range of space velocities is about 5 to 25 ml. of alcohol per 25 ml. of catalyst per hour.

The quantity of dehydration catalyst is not critical since the catalyst system is a heterogeneous one and the life of the catalyst is perpetual as long as precautions are taken to exclude moisture and extraneous reactants capable of poisoning or physically inactivating the catalyst. If temperatures cited above are exceeded for long periods of time, carbonization of reactant on the catalyst surface inactivates the catalyst. However, the active catalyst may be recovered by heating to temperatures of 400 to 600° C. in a stream of air or oxygen.

Although it is preferred to carry out the dehydration as a continuous process with the alcohol reactant passing through a fixed bed or a fluidized bed of the catalyst, a batch process can also be used, if desired.

The dehydration reaction can be effected at atmospheric pressures as well as subatmospheric and superatmospheric pressures. Where it is desired to shorten the residence time without changing the catalyst volume, subatmospheric pressures are preferred as they are in instances where heat sensitive alcohols or hexadienes are involved. Subatmospheric pressures are also preferred when the unsaturated aliphatic alcohol is viscous at atmospheric pressures and would accordingly pass sluggishly through the catalyst at atmospheric or superatmospheric pressures. Subatmospheric pressures of about 1 to 100 mm. Hg are particularly preferred.

This dehydration of unsaturated aliphatic alcohols can also be carried out indirectly in a stepwise manner by first converting the alcohol to a derivative and then subjecting the derivative to a solvolysis reaction. Thus, for example, an ester, such as the p-nitrobenzoate or p-toluenesulfonate of 2,2,4-trimethyl-3-penten-1-ol affords 2,5-dimethyl-2,4-hexadiene when treated with aqueous ethanol, aqueous dioxane, aqueous dimethyl sulfoxide, piperidine, and the like. Treatment of the unsaturated aliphatic alcohol in pyridine with thionyl chloride also affords the hexadiene and constitutes a further variation of the dehydration of unsaturated aliphatic alcohols.

The following examples illustrate the practice of the present invention. All parts and percentages are by weight unless otherwise stated.

*Example 1.—Preparation of 2,2,4-trimethyl-3-penten-1-ol*

A three liter, three-neck, round-bottom flask was equipped with a stirrer, thermometer, and condenser system consisting of a 12 inch Vigreaux column, a Dean-Stark trap and a straight condenser. A solution of 60 g. (0.3 mole) of aluminum isopropoxide in 500 ml. of isopropanol was charged to the flask followed by 63 g. (0.5 mole) of 2,2,4-trimethyl-3-pentenal. This mixture was heated with stirring to about 82° C. for 24 hours at which time the absence of acetone in the refluxing distillate was demonstrated by a negative test with 2,4-dinitrophenyl hydrazine. The isopropanol was removed from the reaction mixture by distillation and the flask cooled to room temperature. A 6 N sulfuric acid solution (75 g. of concentrated sulfuric acid dissolved in 400 ml. of water) was added to the reaction mixture to hydrolyze the aluminum sales present therein. The upper oil layer which thus formed was removed from the reaction flask, washed with water in a separatory funnel, dried over anhydrous potassium carbonate and filtered. The filtrate was distilled affording 34.5 g. (53.5% yield) of 2,2,4-trimethyl-3-penten-1-ol, boiling point, 168–172° C. $n_D^{20}=1.547$. This compound is reported in U.S.P. 2,941,011, issued to H. J. Hagemeyer et al. as having a boiling point of 170° C.

*Example 2.—Preparation of 2,2,4-trimethyl-3-penten-1-yl-p-toluenesulfonate*

A solution of 19.0 g. (0.1 mole) of p-toluenesulfonyl chloride in 100 ml. of pyridine was added at 0° C. to 12.6 g. of 2,2,4-trimethyl-3-penten-1-ol contained in a 250 ml. Erlenmeyer flask and allowed to stand overnight at about 5° C. The reaction mixture was then poured onto ice contained in a 500 ml. beaker. The precipitate which formed was recrystallized from pentane and afforded 14.5 g. (51.5% yield) of the white, crystalline tosylate, 2,2,4 - trimethyl-3-penten-1-yl-p-toluenesulfonate having a melting point of 29° C. Since this compound decomposes on standing, its identification was made from its nuclear magnetic resonance (NMR) spectrum.

*Example 3.—Preparation of 2,2,4-trimethyl-3-penten-1-yl acetate*

To a solution of 5 g. of 2,2,4-trimethyl-3-penten-1-ol in 100 ml. of dry pyridine cooled to 0° in a 250 ml. Erlenmeyer flask was added 20 ml. of acetic anhydride. The reaction was brought to room temperature and then heated on a steam bath for 1.5 hours. The pyridine was removed and 2.3 g. of 2,2,4-trimethyl-3-penten-1-yl acetate obtained by distillation, boiling point 87° C. and $n_D^{20}=1.4356$. The boiling point of this compound reported in U.S. 2,941,011 referred to above was also 187° C.

*Example 4.—Preparation of 2,2,4-trimethyl-3-penten-1-yl-p-nitrobenzoate*

To a solution of 5 g. of 2,2,4-trimethyl-3-penten-1-ol (prepared as described in Example 1) in 100 ml. of dry pyridine contained in a 250 ml. Erlenmeyer flask was added 14 g. of p-nitrogenzoyl chloride. After standing 3 hours the mixture was poured on ice in a 250 ml. beaker and the solid collected and crystallized from pentane. In this manner 6.5 g. (58%) of 2,2,4-trimethyl-3-penten-1-yl-p-nitrobenzoate melting point 36–37° C. was obtained. Microanalysis of this product revealed percent C=64.82; percent H=6.77 and percent N=5.05. The theoretical values are percent C=64.97; percent H=6.77; and percent N=5.05.

*Example 5.—Solvolysis of 2,2,4-trimethyl-3-penten-1-yl-p-nitrobenzoate*

A solution of 6.1 g. of the 2,2,4-trimethyl-3-penten-1-yl-p-nitrogenzoate prepared as an Example 4 in 120 ml. a 2:1 dioxan:water was heated in a 250 ml. round bottom flask equipped with a condenser at 90° C. for 3 days. The mixture was cooled, poured onto ice contained in a 250 ml. beaker and filtered. The filtrate was extracted with ether and pentane, dried, and freed of solvents by distillation. The residual liquid amounted to about 1.0. g. and consisted mainly of 2,5-dimethyl-2,5-hexadiene as analyzed by vapor phase chromatography through its retention time. All of the vapor phase chromatography analyses were carried out using a 2 meter column containing 5% by weight of 20 M Carbowax (tradename for a polyethylene glycol having a molecular weight of about 20,000) on Haloport (tradename for a normally solid polymer of tetrafluoroethylene).

*Example 6.—Catalytic dehydration of 2,2,4-trimethyl-3-penten-1-ol*

The apparatus used for the catalytic dehydration of 2,2,4-trimethyl-3-penten-1-ol consisted of a heat resistant glass tube (Vycor) 18 inches long and 3/4 inches in diameter fitted at both ends with standard taper joints. The tube was supported in a vertical position and wrapped with conventional electrical heating tape to provide a range of operating temperatures which were regulated through a pyrometer controller and thermocouple attached to the wall of the tube. A pressure equalizing funnel attached to the top of the tube was used to feed the alcohol into the reactor. A nitrogen inlet tube was also provided at the top of the tube to provide an inert, non-oxidizing atmosphere in the reactor during the dehydration reactions. The reaction products were collected at the bottom of the tube by gravity in a one liter flask.

connected through a standard taper joint to the bottom end of the tube. This collection flask was equipped with a condenser and drying tube. Solid dehydrated catalysts were packed in the reactor tube and conditioned before use by heating to about 200° C. in a stream of dry nitrogen until water no longer collected in the collection flask.

Using the apparatus described above with a Houdry S–90 catalyst (12.4% $Al_2O_3$ and 87.4% $SiO_2$) at about 120 to 150° C., 25 g. of 2,2,4-trimethyl-3-penten-1-ol prepared as in Example 1 was passed into the reactor in a period of 10 to 120 minutes using 10 to 50 g. of catalyst and such that the space velocity was about 25 ml. of alcohol per 25 ml. of catalyst per hour with a nitrogen flow of about 150 ml. per minute. The reaction product was dissolved in diethyl ether, dried over anhydrous sodium sulfate, the ether distilled off and the residue amounting to 11.3 g. analyzed by nuclear magnetic resonance (NMR) and vapor phase chromatography and identified as 2,5-dimethyl-2,4-hexadiene. This product represented a yield of about 30% 2,5-dimethyl-2,4-hexadiene with a small amount of 2,2,4,4-tetramethyltetrahydrofuran as a by-product. The 2,5-dimethyl-2,4-hexadiene was further identified by copolymerizing it with maleic anhydride according to the method described by A. Henne and A. Turk (J. Am. Chem. Soc. 64, 826 (1942)). This identification is delineated in Example 7.

Similar results were obtained when the Houdry S–90 dehydration catalyst was substituted with $SiO_2$ at about 200° C., Linde 4A, molecular sieves or alumina ($Al_2O_3$) at about 100° C./30 mm.

*Example 7.—Copolymerization of 2,5-dimethyl-2,4-hexadiene and maleic anhydride*

A solution of 11 g. (0.1 mole) of 2,5-dimethyl-2,4-hexadiene (prepared by the method described in Example 6) and 9.8 g. (0.1 mole) of maleic anhydride in 100 ml. of benzene was refluxed for 4 days in a round bottom flask equipped with a reflux condenser. A polymer 14.5 g. was obtained having a melting point of 240° C. a reduced viscosity of 0.24 (0.2 g. in 100 ml. of m-cresol), percent C=69.78, and percent H=7.70. These physical data compare closely with that given by A. Henne and A. Turk (J. Am. Chem. Soc. 64, 826 (1942)) and the calculated values of 69.12% C and 7.75% H..

*Example 8.—Solvolysis of 2,2,4-trimethyl-3-penten-1-yl-p-toluene-sulfonate*

The 2,2,4 - trimethyl - 3-penten-1-yl-p-toluenesulfonate (14.2 g., 0.005 mole) prepared in Example 2 was dissolved in 200 ml. of a 1:1 (volume:volume) ethanol-water solution contained in a 500 ml. Erlenmeyer flask. Titration of the liberated p-toluenesulfonic acid indicated that the solvolysis reaction was finished after 55 minutes. Diethyl ether (100 ml.) was added to the flask followed by sodium hydroxide pellets until the aqueous layer had a pH of 9. The ether layer was removed in a separatory funnel, dried over anhydrous potassium carbonate, evaporated and the residual oil distilled. In this manner, 3.6 g. of 2,5-dimethyl-3-hexene-2-ol was obtained, together with smaller amounts of 2,5-dimethyl-3-hexen-2-yl ethyl ether and 2,5-dimethyl-2,4-hexadiene identified by vapor phase chromatography as previously described. When 10 g. of 2,2,4-trimethyl-3-penten-1-ol-p-toluenesulfonate was solvolyzed with 100 cc. of aqueous dimethyl sulfoxide a yield of 0.7 g. of 2,5-dimethyl-2,4-hexadiene was obtained.

*Example 9.—Reaction of 2,2,4-trimethyl-3-penten-1-ol with pyridine and thionyl chloride*

A solution of 12.8 g. (0.01 mole) of 2,2,4-trimethyl-3-penten-1-ol and 12 g. of pyridine in 200 ml. of dry diethyl ether was cooled to 10° C. in a 3-neck, round bottom flask and then 12.0 g. (0.01 mole) of thionyl chloride added dropwise with stirring. After two hours the ethereal solution was filtered, washed with dilute hydrochloride acid, dried over anhydrous sodium sulfate and distilled. A yellow liquid, boiling at 124–130° C. and amounting to 9.95 g. was recovered and shown by NMR to be a 3.7:2.9 mixture of 2,2,4,4-tetramethyltetrahydrofuran and 2,5-dimethyl-2,4-hexadiene.

*Example 10.—Solvolysis of 2,2-dimethyl-4-ethyl-3-penten-1-yl-p-nitrobenzoate*

When the procedure described in Example 5 is followed with an equivalent amount of 2,2-dimethyl-4-ethyl-3-penten-1-yl-p-nitrobenzoate the product is 2-methyl-5-ethyl-2,4-hexadiene.

*Example 11.—Catalytic dehydration of 2,2-dimethyl-3-penten-1-ol*

The procedure and apparatus described in Example 6 is employed with 2,2-dimethyl-3-penten-1-ol and the Houdry S–90 catalyst. The product of this reaction is 2-methyl-2,4-hexadiene.

*Example 12.—Catalytic dehydration of 2,4-dimethyl-3-ethyl-3-penten-1-ol*

When the procedure and apparatus described in Example 6 is employed with 2,4-dimethyl-2-ethyl-3-penten-1-ol, there is obtained 3,6-dimethyl-3,5-heptadiene.

Although the invention has been described in its preferred forms with a certain degree of particularity, it is understood that the present disclosure of the preferred forms has been made only by way of example, and that numerous changes may be resorted to without departing from the spirit and scope of the invention.

What is claimed is:

1. A process for the production of conjugated dienes which comprises dehydrating an unsaturated aliphatic alcohol having the structure:

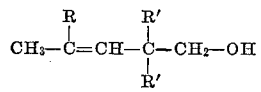

wherein R is selected from the group consisting of hydrogen and monovalent lower saturated aliphatic hydrocarbon radicals and each of R' is a monovalent lower saturated aliphatic hydrocarbon radical.

2. The process claimed in claim 1 wherein the unsaturated aliphatic alcohol is catalytically dehydrated over a silica-alumina dehydration catalyst.

3. The process claimed in claim 2 wherein the dehydration temperature is about 50° C. to 200° C., and the space velocity is about 5 to 25 ml. of unsaturated aliphatic alcohol per 25 ml. of dehydration catalyst per hour.

4. The process claimed in claim 2 wherein the temperature is about 80° C. to about 200° C. and the space velocity is about 25 ml. of unsaturated aliphatic alcohol per 25 ml. of dehydration catalyst per hour.

5. The process claimed in claim 2 wherein the dehydration is carried out in a non-oxidizing atmosphere.

6. The process claimed in claim 2 wherein the dehydration is carried out at subatmospheric pressures.

7. The process claimed in claim 6 wherein the subatmospheric pressure is about 1 to 100 mm. of mercury.

8. The process claimed in claim 2 wherein the unsaturated aliphatic alcohol is catalytically dehydrated over alumina at about 50 to 200° C.

9. The process claimed in claim 8 wherein the temperature is about 80 to 150° C. and the pressure is about 10 to 50 mm. of mercury.

10. The process claimed in claim 1 wherein the unsaturated aliphatic alcohol is catalytically dehydrated over $SiO_2$ at a temperature of 150 to 250° C.

11. The process claimed in claim 1 wherein the unsaturated aliphatic alcohol is catalytically dehydrated over molecular sieves at a temperature of about 50 to 150° C.

12. The process claimed in claim 1 wherein the unsaturated aliphatic alcohol is dehydrated through the solvolysis of its ester.

13. The process claimed in claim 12 wherein the ester is the p-nitrobenzoate of the unsaturated aliphatic alcohol.

14. The process claimed in claim 12 wherein the ester is the p-toluenesulfonate of the unsaturated aliphatic alcohol.

15. The process claimed in claim 12 wherein the unsaturated aliphatic alcohol is 2,2,4-trimethyl-3-penten-1-ol.

16. The process claimed in claim 13 wherein the solvolysis is carried out in a 2:1 (volume:volume) dioxan:water mixture.

17. The process claimed in claim 14 wherein the solvolysis is carried out in a 1:1 (volume:volume) ethanol:water mixture.

18. A process for the production of 2,5-dimethyl-2,4-hexadiene which comprises dehydrating 2,2,4-trimethyl-3-penten-1-ol.

References Cited by the Examiner

Wilcox and Nealy, J. Org. Chem. 28, 3454–7 (December 1963).

DELBERT E. GANTZ, *Primary Examiner.*

G. E. SCHMITKONS, *Assistant Examiner.*